United States Patent
Suzuki et al.

(10) Patent No.: US 9,309,120 B2
(45) Date of Patent: Apr. 12, 2016

(54) METHOD FOR PRODUCING ALKALI METAL NITRIDE OR ALKALINE EARTH METAL NITRIDE

(75) Inventors: Shoji Suzuki, Sakura (JP); Kazuhiko Tokoyoda, Sakura (JP); Tsutomu Suzuki, Sakura (JP)

(73) Assignee: TAIHEIYO CEMENT CORPORATION, Tokyo (JP)

( * ) Notice: Subject to any disclaimer, the term of this patent is extended or adjusted under 35 U.S.C. 154(b) by 391 days.

(21) Appl. No.: 13/509,457

(22) PCT Filed: Nov. 11, 2010

(86) PCT No.: PCT/JP2010/070113
§ 371 (c)(1),
(2), (4) Date: May 11, 2012

(87) PCT Pub. No.: WO2011/059028
PCT Pub. Date: May 19, 2011

(65) Prior Publication Data
US 2012/0225005 A1 Sep. 6, 2012

(30) Foreign Application Priority Data

Nov. 12, 2009 (JP) ................................ 2009-258801
Feb. 8, 2010 (JP) ................................ 2010-025135
Feb. 8, 2010 (JP) ................................ 2010-025152
Apr. 28, 2010 (JP) ................................ 2010-103334
Aug. 24, 2010 (JP) ................................ 2010-187114
Aug. 24, 2010 (JP) ................................ 2010-187115

(51) Int. Cl.
*C01B 21/06* (2006.01)

(52) U.S. Cl.
CPC ............ *C01B 21/0607* (2013.01); *C01B 21/061* (2013.01); *C01B 21/0602* (2013.01); *C01B 21/0612* (2013.01); *C01P 2002/50* (2013.01); *C01P 2002/72* (2013.01)

(58) Field of Classification Search
CPC .. C01B 21/06; C01B 21/0607; C01B 21/0612
See application file for complete search history.

(56) References Cited

U.S. PATENT DOCUMENTS 4,196,178 A 4/1980 Iwai et al.
2002/0192507 A1* 12/2002 Dwilinski et al. ............ 428/698
(Continued)

FOREIGN PATENT DOCUMENTS

JP 54-145400 A 11/1979
JP 02-233509 9/1990
(Continued)

OTHER PUBLICATIONS

Moody et al.; Alkali Metal Nitrides; Journal of Chemical Education; vol. 43, No. 4, Apr. 1966.*
(Continued)

*Primary Examiner* — Guinever S Gregorio
(74) *Attorney, Agent, or Firm* — Oblon, McClelland, Maier & Neustadt, L.L.P.

(57) ABSTRACT

There is provided a method for efficiently producing a high-purity alkali metal nitride or alkaline earth metal nitride by simple processes.
Specifically provided is a method for producing an alkali metal nitride, an alkaline earth metal nitride, or a composite thereof, the method including thermally decomposing one or more alkali metal amides or alkaline earth metal amides.

14 Claims, 11 Drawing Sheets

(56) References Cited

U.S. PATENT DOCUMENTS

| 2005/0118087 | A1 | 6/2005 | Lacoste |
| 2006/0127304 | A1 | 6/2006 | Fujii et al. |
| 2007/0116623 | A1 | 5/2007 | Chen et al. |
| 2008/0102016 | A1* | 5/2008 | Hashimoto ............ 423/409 |
| 2010/0151194 | A1* | 6/2010 | D'Evelyn ............ 428/141 |

FOREIGN PATENT DOCUMENTS

| JP | 2005-281115 A | 10/2005 |
| JP | 2005-531483 A | 10/2005 |
| JP | 2006-8440 A | 1/2006 |
| JP | 2006-205148 A | 8/2006 |
| JP | 3837588 B2 | 10/2006 |
| WO | WO 2007/060944 A1 | 5/2007 |

OTHER PUBLICATIONS

Juza; Amides of the Alkali and the Alkaline Earth Metals; Angew. Chem. Internat. Edit.; vol. 3, No. 7; 1964.*

Tan et al.; Interaction of hydrogen with metal nitrides and imides; Nature; vol. 420; Nov. 2002.*

International Search Report Issued Dec. 21, 2010 in PCT/JP2010/070113.

Michinori Ohki et al., "Kagaku Dijiten (Encyclopedic Dictionary of Chemistry)", Tokyo Kagaku Dojin Co., Ltd., first edition, Oct. 20, 1989, p. 1413 (with partial English translation).

"Shin Jikken Kagaku Koza 8, Muki Kagoubutsu no Gosei (I) (New Experimental Chemistry Course 8, Synthesis of Inorganic Compounds (I))". The Chemical Society of Japan, Dec. 20, 1976, p. 414 (with partial English translation).

"Kagaku Daijiten 5 (Encyclopaedia Chimica 5)", Kyoritsu Shuppan Co., Ltd., vol. 5, Feb. 15, 1987, p. 880 (with partial English translation).

Masayoshi Nakahara, "Muki Kagoubutsu Sakutai Jiten (Dictionary of Inorganic Compounds and Complexes)", Kodansha Ltd., Jun. 10, 1997, p. 476 (with partial English translation).

Office Action issued May 27, 2014 in Japanese Patent Application No. 2011-024950 (with partial English language translation).

Office Action issued Jul. 15, 2014 in Japanese application, 2011-024661, filed on Feb. 8, 2011 (with English Translation).

Office Action issued Jul. 15, 2014 in Japanese application, 2010-259381, filed on Nov. 19, 2010 (with English Translation).

* cited by examiner

METHOD FOR PRODUCING ALKALI METAL NITRIDE OR ALKALINE EARTH METAL NITRIDE

TECHNICAL FIELD

The present invention relates to a method for producing an alkali metal nitride and an alkaline earth metal nitride.

BACKGROUND ART

In recent years, attention has been directed to an alkali metal nitride or an alkaline earth metal nitride as a material such as a raw material of aluminum nitride used for a semiconductor device, a metal sliding member, an electrode construction material and the like. A high-purity product is required for the metal nitride used for the applications.

Examples of a conventional method for producing an alkali metal nitride and an alkaline earth metal nitride include a method for heating alkaline earth metals such as calcium in a nitrogen gas stream (Non Patent Literatures 1 and 2).

However, this method nitrides only the surfaces of these metals, and has difficulty in nitriding the inside thereof. Therefore, the metal nitride obtained by the method cannot be used for the above-mentioned application requiring a high-purity product.

Another method is a method for heating calcium with ammonia, a problem of which method is production of calcium hydride as a by-product (Non Patent Literature 3). Furthermore, yet another method is a method for heating tricalcium tetranitride to 250° C., problems of which are explosiveness and toxicity (Non Patent Literature 4).

Furthermore, there is disclosed a method for reacting a molten zinc-calcium alloy with a heated and pressurized nitrogen jet to synthesize calcium nitride (Patent Literature 1). However, this method requires a special device, and thus it is difficult to say that the method is an industrially advantageous method.

PRIOR ART LITERATURE

[Patent Literature]
[Patent Literature 1] JP-A-2005-531483
[Non Patent Literature]
[Non Patent Literature 1] "Kagaku Daijiten (Encyclopedic Dictionary of Chemistry)", first edition, edited by Michinori Oki et al., Tokyo Kagaku Dojin, first edition, p. 1413, 1989
[Non Patent Literature 2] "Shin Jikken Kagaku Koza 8, Muki Kagoubutsu no Gosei (I) (New Experimental Chemistry Course 8, Synthesis of Inorganic Compounds (I))", edited by the Chemical Society of Japan, Maruzen Co., Ltd., p. 414, 1976,
[Non Patent Literature 3] "Kagaku Daijiten 5 (Encyclopaedia Chimica 5)", miniature edition, Kyoritsu Shuppan Co., Ltd., p. 880, 1987
[Non Patent Literature 4] "Muki Kagoubutsu Sakutai Jiten (Dictionary of Inorganic Compounds and Complexes)", Masayoshi Nakahara, Kodansha Ltd., p. 476, 1997

SUMMARY OF INVENTION

Problem to be Solved by the Invention

It is an object of the present invention to provide a method for simply producing a high-purity alkali metal nitride and alkaline earth metal nitride with good yield without causing the above-mentioned problems.

Means for Solving the Problem

The present inventors have carried out diligent studies in view of the above-mentioned circumstances. As a result, the inventors have found that an easily available alkali metal amide or alkaline earth metal amide is used as a raw material, and the amide can merely be thermally decomposed to obtain a high-purity metal nitride with good yield, and completed the present invention.

That is, the present invention provides a method for producing an alkali metal nitride, an alkaline earth metal nitride, or a composite thereof, the method including thermally decomposing one or more alkali metal amides or alkaline earth metal amides.

Advantageous Effect of Invention

The present invention can simply produce a high-purity alkali metal nitride, alkaline earth metal nitride, and composite thereof with good yield.

MODES FOR CARRYING OUT THE INVENTION

Figure 1:
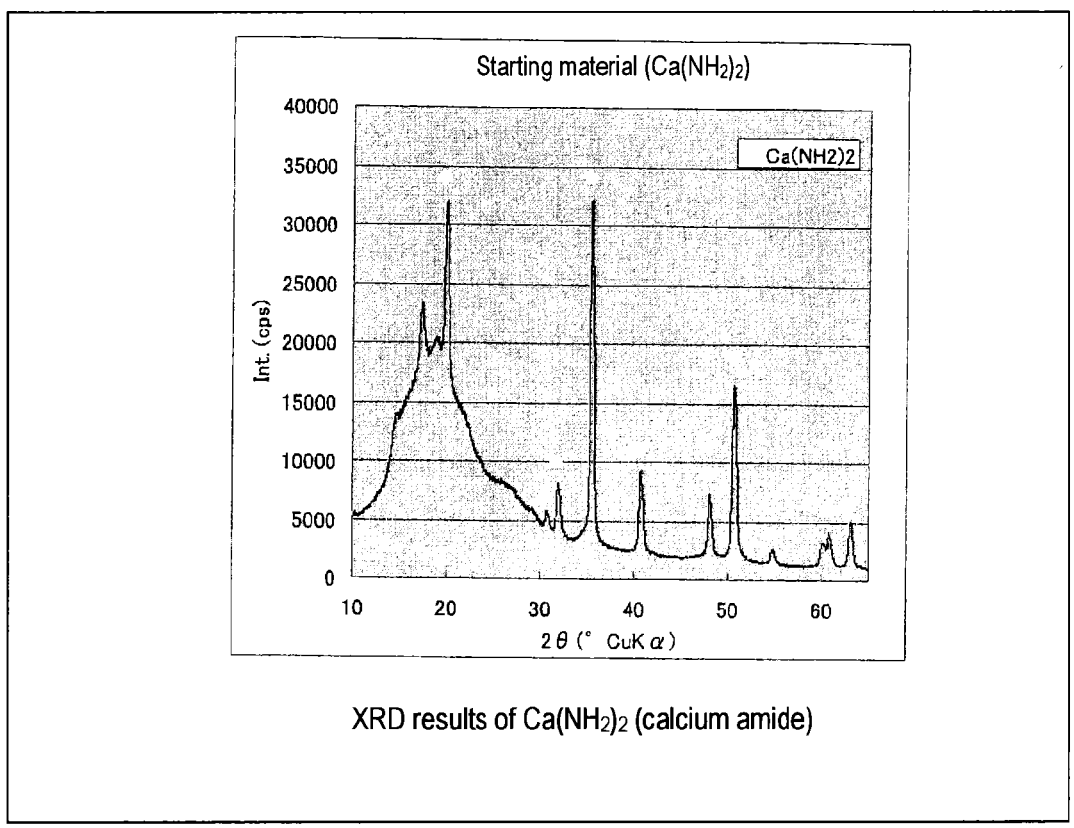
FIG. 1 shows the XRD results of a starting material.

Raw materials used for the present invention are one or more selected from alkali metal amides and alkaline earth metal amides. For example, $(Li, Na, K)_3N$, $(Be, Mg, Ca, Sr, Ba)_3N_2$, and $(Be, Mg, Ca, Sr, Ba)_2N$ are preferable as alkali metal nitrides and alkaline earth metal nitrides obtained. Of these, one or more selected from $Li_3N$, $Ca_3N_2$, $Sr_3N_2$, $Ba_3N_2$, $Ca_2N$, $Sr_2N$, and $Ba_2N$ are preferable. As a composite thereof, a composite of two or more of the metal nitrides is a combination of two or more of the above-mentioned alkali metal nitrides and alkaline earth metal nitrides. A combination of two or more metals may be suitably determined for any purpose. Examples of the combination include combinations of calcium-strontium, calcium-barium, and strontium-barium. A content ratio of the two or more metals may be also suitably determined for any purpose. For example, a molar ratio of the two metals is preferably from 1:99 to 99:1, more preferably from 1:20 to 20:1, and still more preferably 1:10 to 10:1.

An alkali metal amide as a raw material of the present invention is a known compound. The alkali metal amide can be produced by a known method, for example, a method for making ammonia act on an alkali metal at a high temperature ("Kagaku Daijiten (Encyclopaedia Chimica)", miniature edition, Kyoritsu Shuppan Co., Ltd., the paragraphs of sodium amide and potassium amide), and the like.

An alkaline earth metal amide as a raw material of the present invention is a known compound used for a hydrogen storage material and the like. The alkaline earth metal amide can be produced by a known method. Examples thereof include a method for producing hexaammine calcium (0) from a calcium metal and ammonia, and decomposing the hexaammine calcium in the presence of a catalyst ("Kagaku Daijiten (Encyclopaedia Chimica)", miniature edition, Kyoritsu Shuppan Co., Ltd., the paragraph of calcium amide), and a method for reacting a metal hydride with ammonia (JP-A-2006-8440).

The alkali metal amide or the alkaline earth metal amide used in the present invention can also be obtained by the above-mentioned method. However, means for reacting an alkali metal or alkaline earth metal amide with ammonia to form a liquid phase thereof, thereby obtaining the amide is particularly preferably employed in view of producing a high-purity alkali metal nitride or alkaline earth metal nitride.

The amount of ammonia used is preferably 2 mol or more based on 1 mol of the alkali metal or the alkaline earth metal. Because ammonia is used also as a solvent, the more ammonia is more preferred. The reaction temperature of the alkali metal or the alkaline earth metal and ammonia may be suitably determined depending on the kind of the alkali metal or the alkaline earth metal. The reaction temperature is preferably from −77 to 300° C., more preferably from 20 to 200° C., and still more preferably from 50 to 100° C. Because the alkali metal or the alkaline earth metal and ammonia form a liquid phase, a uniform alkali metal amide or alkaline earth metal amide is produced. Therefore, a reaction time is the time required to form a liquid phase. Usually, the reaction time is preferably from 1 minute to 72 hours, and more preferably from about 1 hour to about 3 hours.

When the alkali metal amide or the alkaline earth metal amide is produced by the method in the case where the composite of two or more alkali metal nitrides or alkaline earth metal nitrides is obtained, the mixture of the raw materials forms a liquid phase. Thereby, the obtained composite also becomes uniform.

In the present invention, a temperature for thermally decomposing the alkali metal amide or the alkaline earth metal amide is preferably 100° C. or more, and more preferably 300° C. or more. The upper limit of the temperature is a temperature at which the target metal nitride is not decomposed. However, the upper limit is preferably 1500° C. or less in views of a reactor and economical efficiency. Therefore, the temperature for thermally decomposing the metal amides is preferably from 100 to 1500° C., and more preferably from 300 to 1300° C.

Particularly, the temperature for thermally decomposing the alkali metal amide in the present invention is preferably 100° C. or more, more preferably 200° C. or more, and still more preferably 300° C. or more. The upper limit of the temperature is preferably a temperature at which the alkali metal nitride is not decomposed. The lower limit thereof is preferably a temperature at which lithium nitride is completely produced. Therefore, the temperature for thermally decomposing the alkali metal amide is preferably from 100 to 700° C., more preferably from 200 to 700° C., and particularly preferably from 300 to 700° C.

Furthermore, in the present invention, the temperature for thermally decomposing the alkaline earth metal amide is preferably 510° C. or more, more preferably 800° C. or more, and still more preferably 1000° C. or more. The upper limit of the temperature is a temperature at which the alkaline earth metal nitride is not decomposed. However, the upper limit is preferably 1500° C. or less in views of a reactor and economical efficiency. Therefore, the temperature for thermally decomposing the alkaline earth metal amide is preferably from 510 to 1500° C., more preferably from 800 to 1300° C., and particularly preferably from 1000 to 1200° C.

Because the metal amide as a starting material is easily oxidized in the air, a reaction is preferably performed under vacuum, or under an inert gas such as nitrogen gas, helium gas, or argon gas. Particularly, the reaction is preferably performed under an inert gas such as nitrogen gas, helium gas, or argon gas. When the reaction is performed under a gas atmosphere, a pressure thereof is not particularly limited. However, the reaction is preferably performed at a normal as being economical. The reaction may be performed in a batch or continuous system. In the case of mass production, the reaction is advantageously performed in the continuous system.

The reaction time may be suitably determined depending on the device, the reaction temperature, and the amount of a raw material. Usually, the reaction time is preferably from 10 minutes to 48 hours, more preferably from 1 hour to 24 hours, and particularly preferably from 3 hours to 12 hours.

The reaction device may be a device capable of withstanding a high temperature. For example, a tubular furnace, an electric furnace, a batch kiln, and a rotary kiln may be used.

Because only the target metal nitride or the composite thereof remains in a powdery state in the reaction device in the case of the batch system, for example, after completing the reaction, the metal nitride or the composite is extremely easily collected.

On the other hand, when the rotary kiln filled with, for example, $N_2$, He, and Ar is used in the case of the continuous system, the target metal nitride is easily and continuously collected.

The alkali metal nitride and the alkaline earth metal nitride obtained by the method of the present invention have high purity because the thermal decomposition reaction easily undergoes a reaction to the inside thereof.

Because the alkali metal nitrides and alkaline earth metal nitrides are uniformly dispersed in the various alkali metal nitride composites and alkaline earth metal nitride composites thus obtained, to produce little maldistribution, various applications can be expected. A solid solution of the various alkali metal nitrides and alkaline earth metal nitrides may be formed depending on the combination of the alkaline earth metals. New applications for the solid solution are expected.

EXAMPLES

Hereinafter, the present invention will be further described in detail with reference to Examples. However, the present invention is not limited to these Examples.

Example 1

Figure 3:
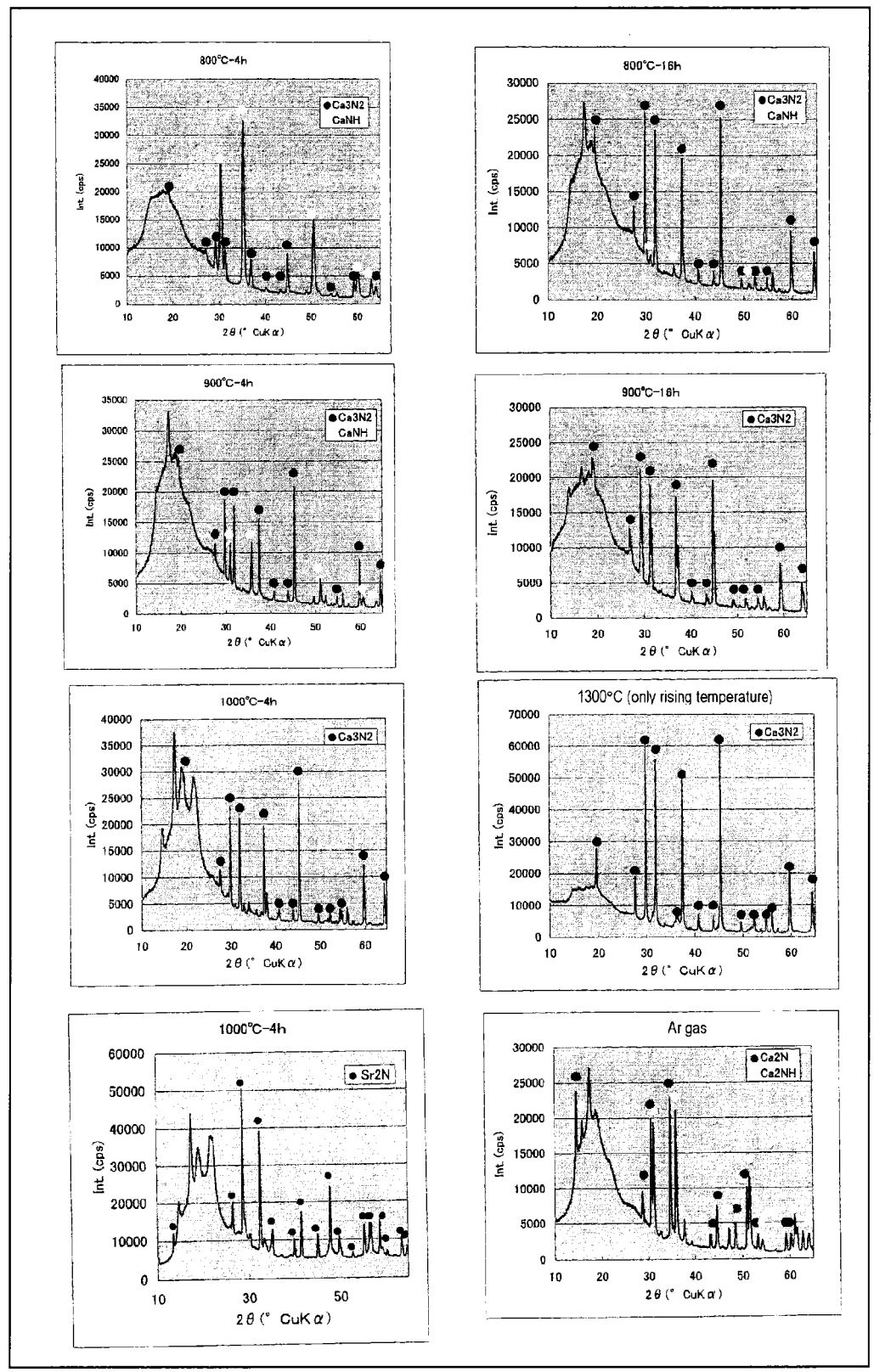
FIG. 3 shows the XRD results of alkaline earth metal nitrides obtained by various reaction conditions of Example 1.

A producing test of an alkaline earth metal nitride was performed under conditions of a temperature and a time (h) as shown in FIG. 3. That is, 3 g of calcium amide was placed in a furnace core tube (an inner diameter of 50 mm and a length of 600 mm) and the furnace core tube was sealed with a silicon cap in a glove box. The furnace core tube taken out from the glove box was set in a tubular furnace, and was heated in a nitrogen atmosphere. Under the same conditions as above except that 3 g of strontium amide was placed in a furnace core tube in place of 3 g of calcium amide, the furnace core tube was heated. A temperature under an Ar gas atmosphere was 900° C., and a reaction time was 6 hours.

Figure 2:
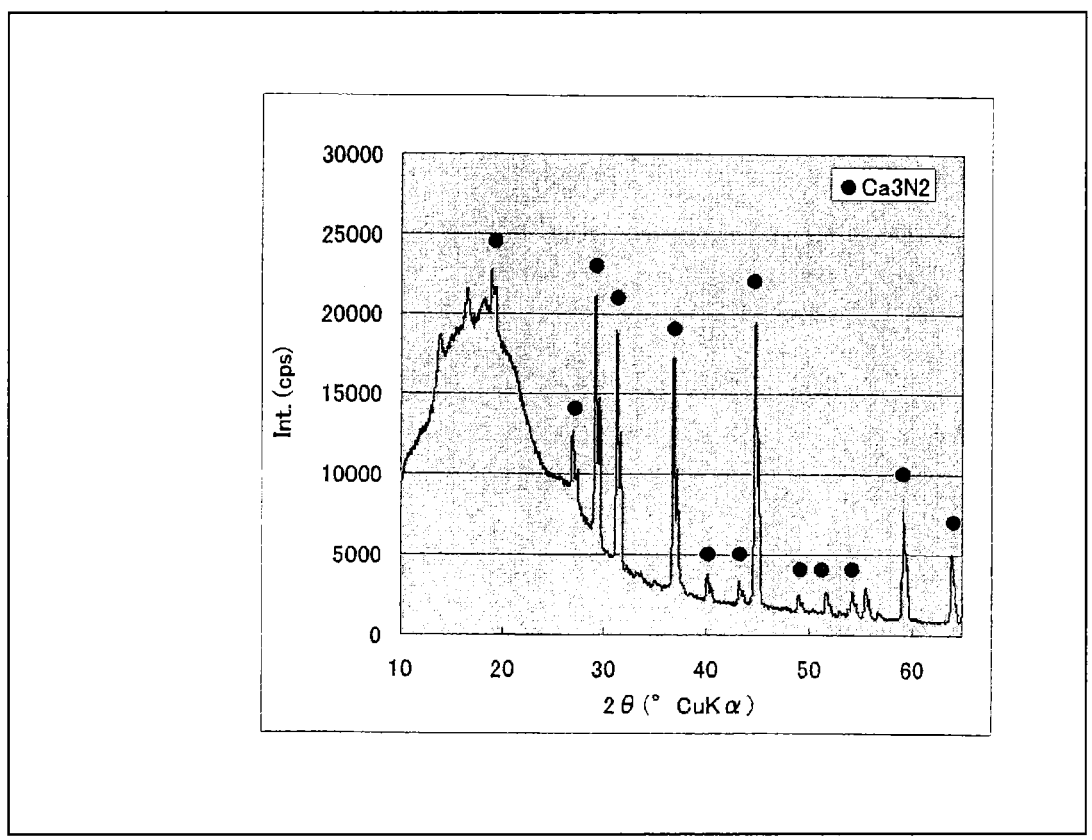
FIG. 2 shows the XRD results of an alkaline earth metal nitride.

Powder XRD analysis of the obtained compound was performed. The results are shown in FIG. 3. For reference, the XRD of the calcium amide as a raw material is shown in FIG. 1. The XRD of $Ca_3N_2$ is shown in FIG. 2.

The XRD results show that a target high-purity alkaline earth metal nitride is produced at high yield by heating from 500 to 1500° C. The XRD results also show that the higher a reaction temperature is, the shorter the reaction time is.

Example 2

Figure 4:
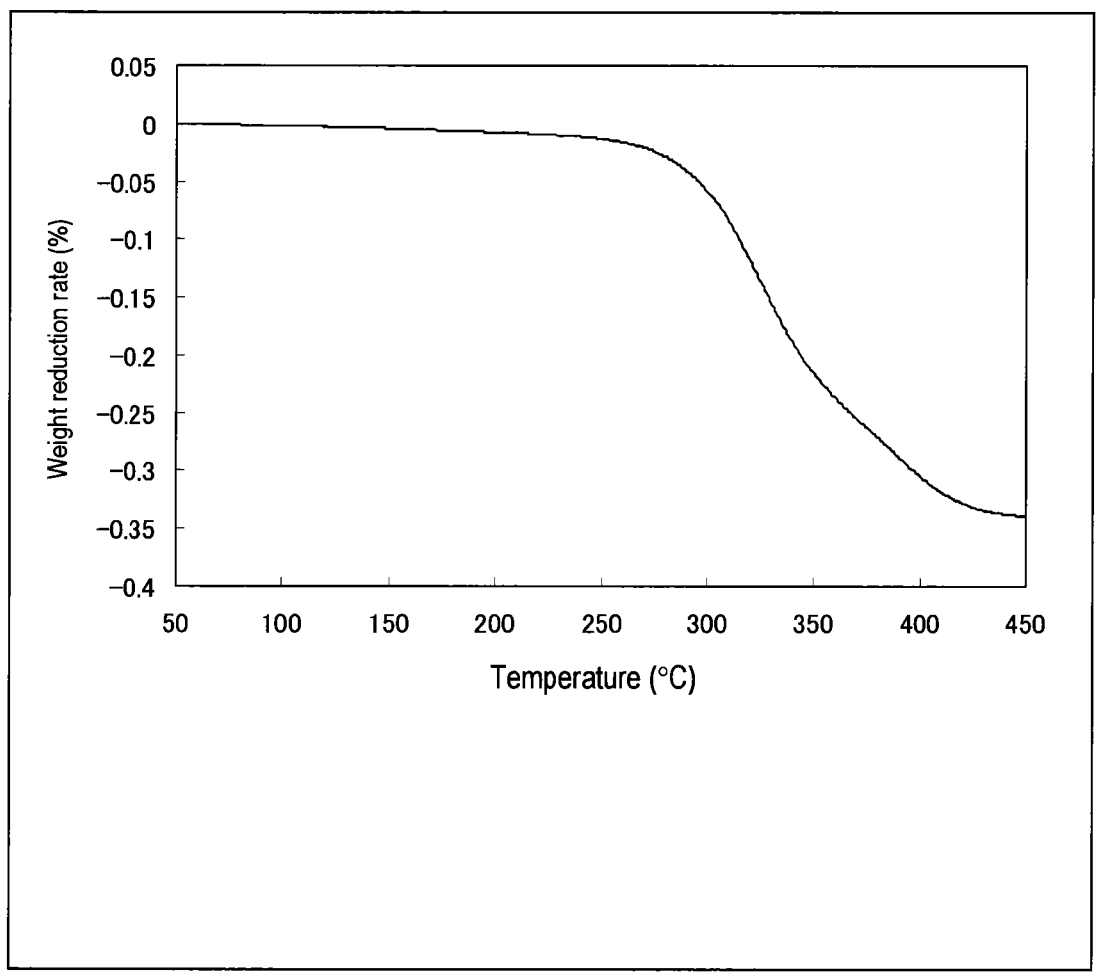
FIG. 4 shows the TG/DTA measurement results of lithium amide.

The thermal decomposition temperature of lithium amide was measured using a thermogravimetric/differential thermal analyzer (TG/DTA). The measurement was performed under a nitrogen gas flow from room temperature to 450° C. after a sample pan was filled with 10 mg of lithium amide. As shown in FIG. 4, the thermal decomposition start temperature of the lithium amide was 250° C.

Example 3

3 g of lithium amide was placed in a furnace core tube (an inner diameter of 50 mm and a length of 600 mm) and the furnace core tube was sealed with a silicon cap in a glove box. The furnace core tube taken out from the glove box was set in a tubular furnace, and was heated in a helium atmosphere.

Figure 5:
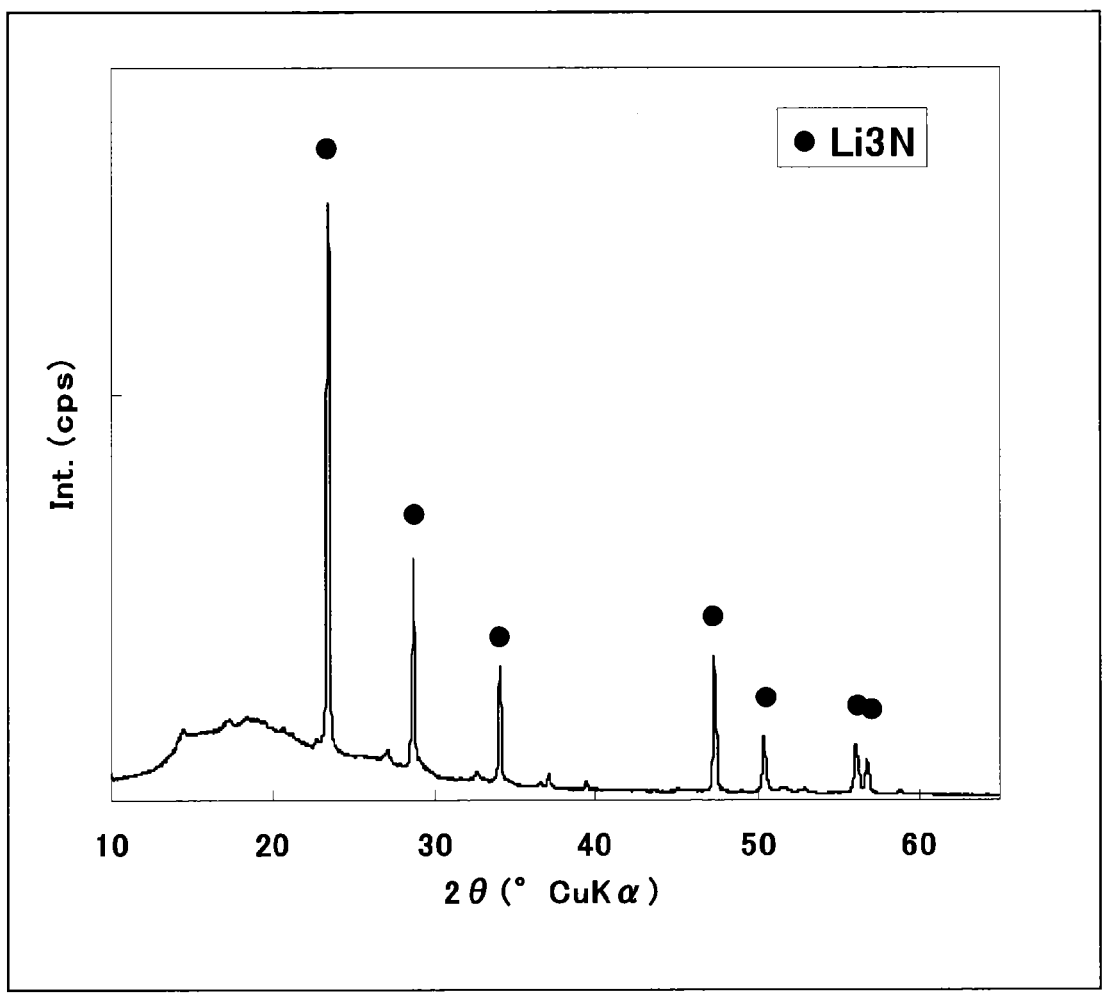
FIG. 5 shows the XRD results of lithium nitride obtained in Example 3.
Figure 6:
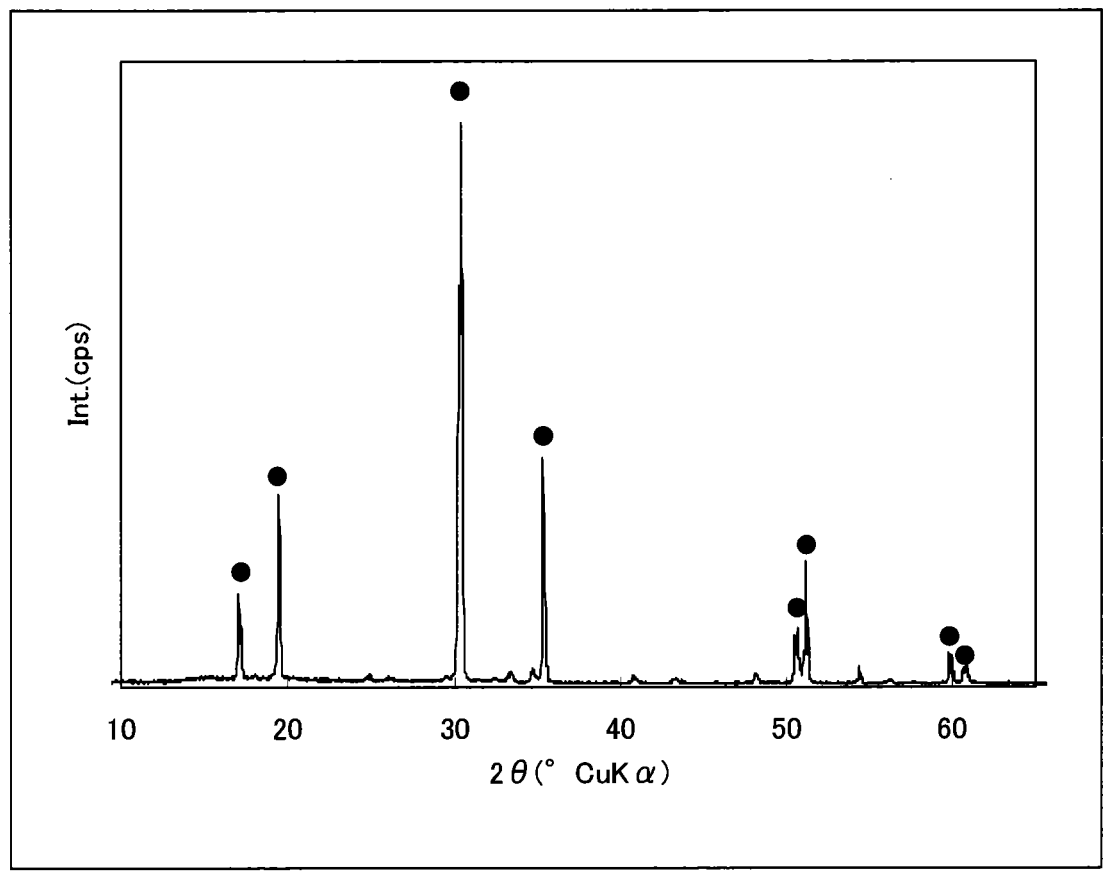
FIG. 6 shows the XRD results of lithium amide.

A temperature was 300° C., and a reaction time was 24 hours. The powder XRD analysis of the obtained compound was performed, resulting that the whole of the phase was lithium nitride ($Li_3N$) (see FIG. 5). For reference, the XRD of the lithium amide is shown in FIG. 6.

Example 4

Figure 7:
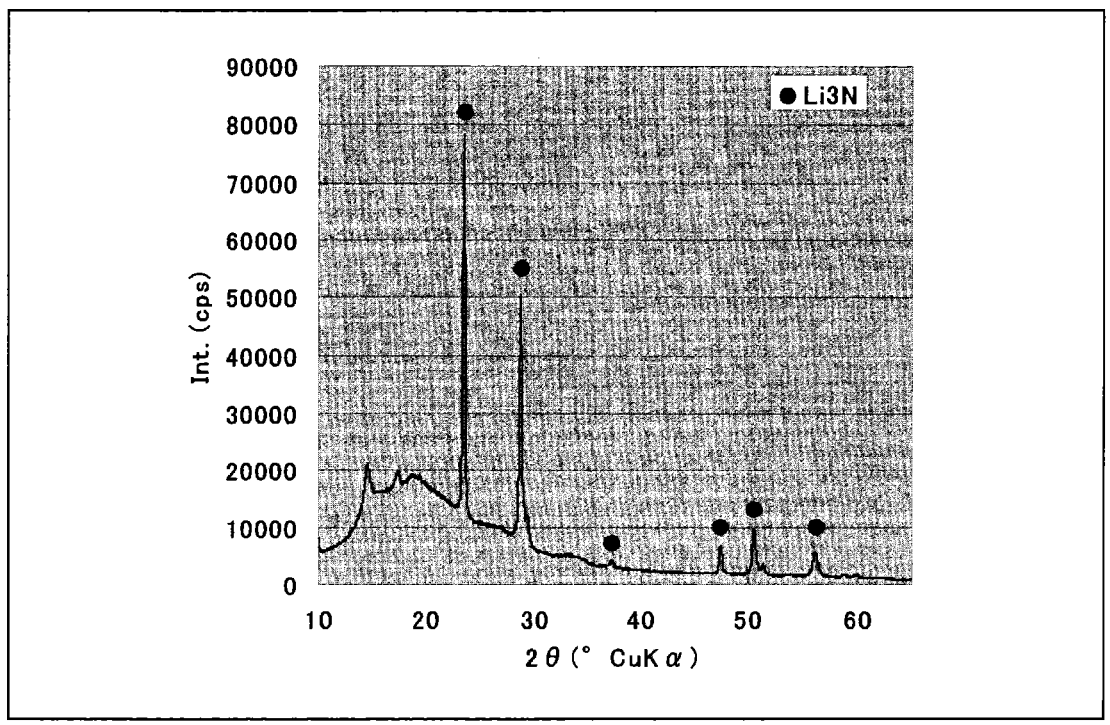
FIG. 7 shows the XRD results of lithium nitride obtained in Example 4.

The same operation as that of Example 3 was performed using 3 g of lithium amide. A temperature was 400° C., and a reaction time was 5 hours. The powder XRD analysis of the obtained compound was performed, resulting that the whole of the phase was $Li_3N$ (see FIG. 7).

Example 5

Figure 8:
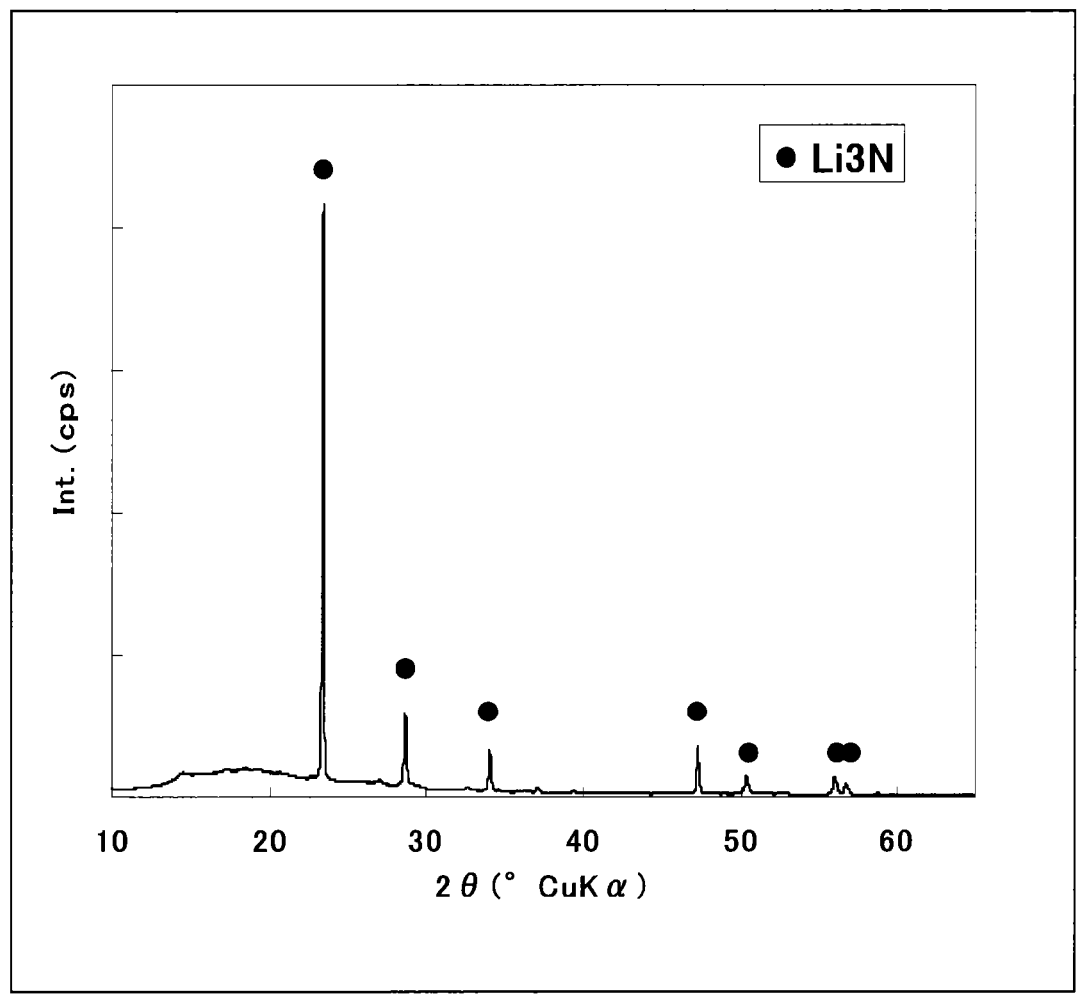
FIG. 8 shows the XRD results of lithium nitride obtained in Example 5.

The same operation as that of Example 3 was performed using 3 g of lithium amide. A temperature was 700° C., and a reaction time was 4 hours. The powder XRD analysis of the obtained compound was performed, resulting that the whole of the phase was $Li_3N$ (see FIG. 8).

Example 6

Figure 9:
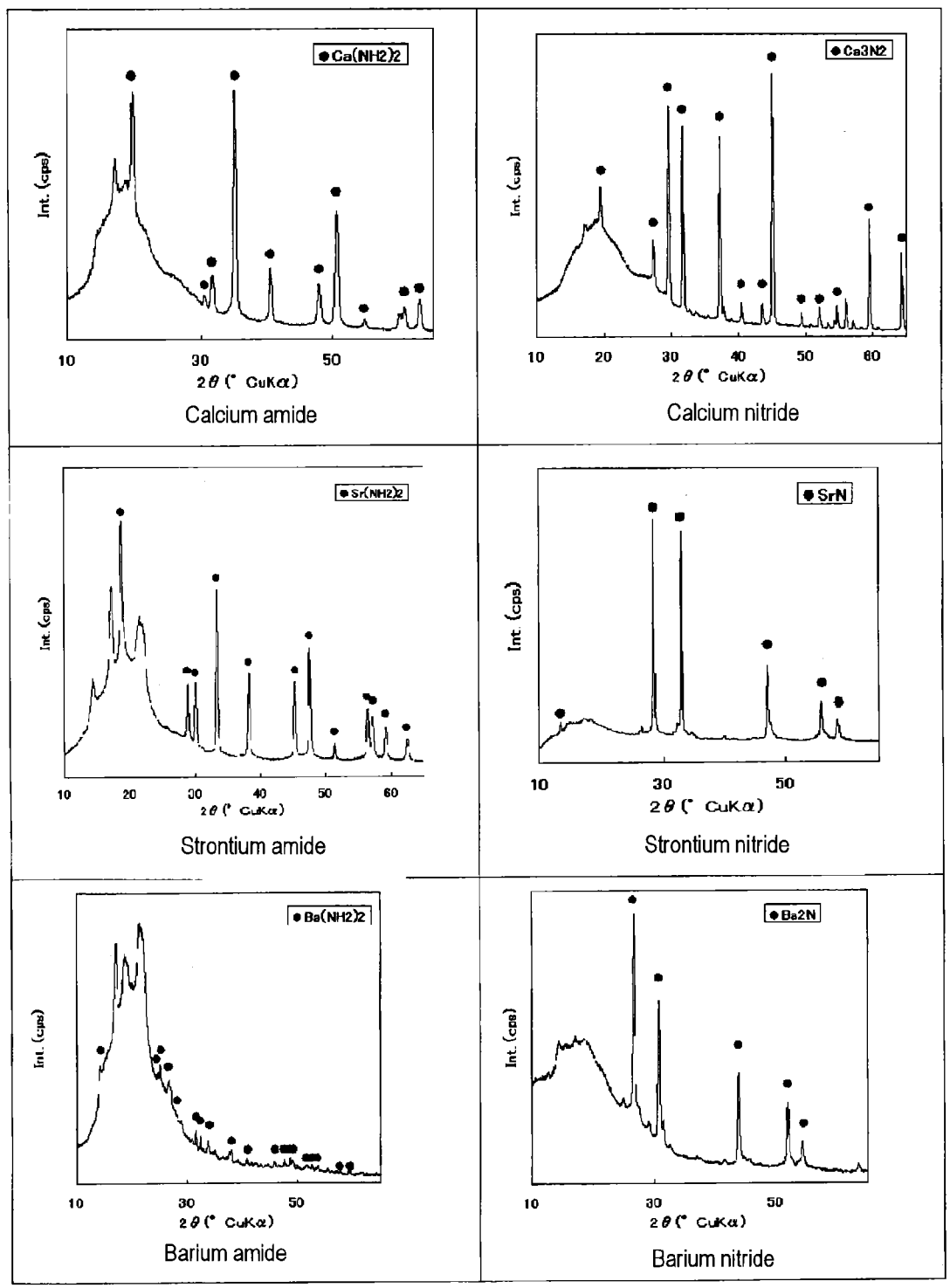
FIG. 9 shows the XRD results of alkaline earth metal amides and alkaline earth metal nitrides obtained in Examples 6 to 8.

After 2.00 g of metal calcium was placed in a 200 cc reaction container, and the reaction container was filled with 40 g of ammonia, the metal calcium is reacted with the ammonia at 100° C. for 2 hours. The structure of product collected after the reaction was analyzed by XRD, resulting that the structure was a single phase of calcium amide (FIG. 9). The weight of the collected calcium amide was 3.58 g, and the yield thereof was 99.6%.

2.00 g of the obtained calcium amide compound was heated in a nitrogen atmosphere at 1000° C. for 4 hours. The structure of the reaction product was analyzed by XRD, resulting that the structure was a single phase of calcium nitride (FIG. 9). The weight of the obtained calcium nitride was 1.37 g, and the yield thereof was 99.8%.

Example 7

When 2.00 g of metal strontium was used as a starting material in the same manner as Example 6, the structure of an amide compound after the reaction of the metal strontium and ammonia was a single phase of strontium amide. The yield thereof was 99.2% (FIG. 9). The product after the thermal decomposition of the obtained strontium amide was a single phase of strontium nitride. The yield thereof was 99.5% (FIG. 9).

Example 8

Furthermore, when 2.00 g of metal barium was used as a starting material in the same manner as Example 6, the structure of an amide compound after the reaction of the metal barium and ammonia was a single phase of barium amide. The yield thereof was 99.7% (FIG. 9). The product after the thermal decomposition of the obtained barium amide was a single phase of barium nitride. The yield thereof was 99.3% (FIG. 9).

Example 9

Figure 10:
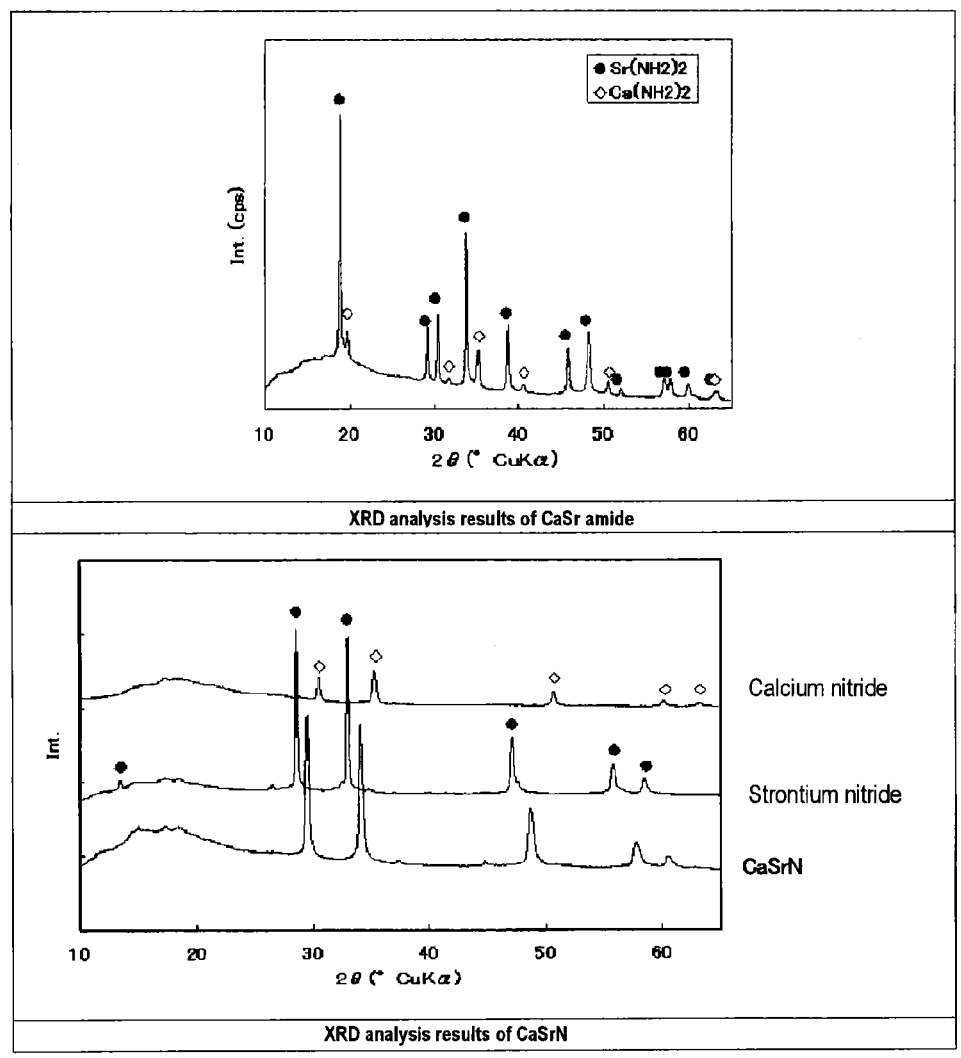
FIG. 10 shows the XRD results of an alkaline earth metal amide and an alkaline earth metal nitride obtained in Example 9.

1.04 g of metal calcium and 2.23 g of metal strontium were weighed, and were placed in a pressure vessel (200 mL). The pressure vessel was vacuumized. Then, 40 g of ammonia was placed therein, and the reaction was performed at 100° C. for 2 hours. The mineral phase of the obtained product after the reaction was confirmed by XRD, resulting that the mineral phase was a mixed phase of calcium amide and strontium amide (upper side in FIG. 10). The thermal decomposition reaction of the obtained product was performed in a nitrogen atmosphere at 1000° C. for 4 hours. The mineral phase of the product thus obtained was confirmed using XRD, and it was confirmed that the mineral phase was a single phase of the product. It was confirmed that a peak position was in the middle of calcium nitride and strontium nitride (lower side in FIG. 10). This is presumed to be a solid solution of nitrides of calcium and strontium.

Example 10

Figure 11:
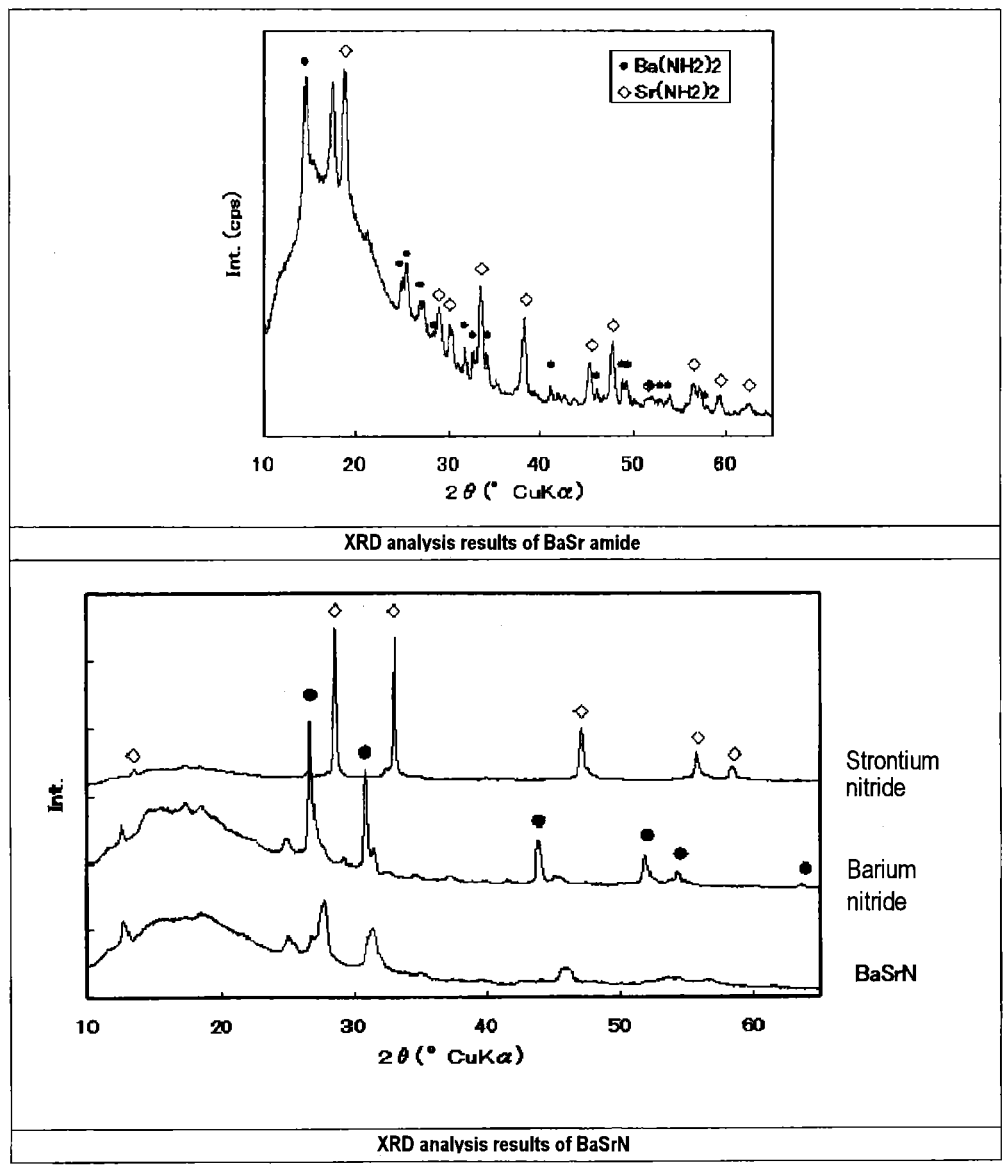
FIG. 11 shows the XRD results of an alkaline earth metal amide and an alkaline earth metal nitride obtained in Example 10.

0.68 g of metal strontium and 2.60 g of metal barium were weighed, and were placed in a pressure vessel (200 mL). The pressure vessel was vacuumized. Then, 40 g of ammonia was placed therein, and the reaction was performed at 100° C. for 2 hours. The mineral phase of the obtained product after the reaction was confirmed by XRD, resulting that the mineral phase was a mixed phase of strontium amide and barium amide (upper side in FIG. 11). The thermal decomposition reaction of the obtained product was performed in a nitrogen atmosphere at 900° C. for 4 hours. The mineral phase of the product thus obtained was confirmed using XRD, and it was confirmed that the mineral phase was a single phase of the product. It was confirmed that a peak position was in the middle of strontium nitride and barium nitride (lower side in FIG. 11). It is presumed that a solid solution of nitrides of strontium and barium was produced.

The invention claimed is:

1. A method for producing a metal nitride, the method comprising:
   (i) thermally decomposing a mixture of at least two alkali metal amides at a temperature of 300° C. to 700° C. for 1 hour to 24 hours under vacuum or under an inert gas to form a composite of at least two alkali metal nitrides;
   (ii) thermally decomposing a mixture of at least two alkaline earth metal amides at a temperature of 800° C. to 1200° C. for 1 hour to 24 hours under vacuum or under an inert gas to form a composite of at least two alkaline earth metal nitrides.

2. The method according to claim 1, wherein at least one of the alkali metal amides, at least one of the alkaline earth metal amides, or at least one of the alkali metal amides and at least one of the alkaline earth metal amides, is decomposed as a raw material.

3. The method according to claim 2, wherein at least one of the alkali metal amides, at least one of the alkaline earth metal amides, or at least one of the alkali metal amides and at least one of the alkaline earth metal amides, is obtained by reacting an alkali metal or an alkaline earth metal with ammonia to form a liquid phase thereof.

4. The method according to claim 1, wherein the mixture of at least two alkali metal amides is thermally decomposed to form the composite of at least two alkali metal nitrides.

5. The method according to claim 4, wherein at least one of the alkali metal amides is decomposed as a raw material.

6. The method according to claim 4, wherein at least one of the alkali metal amides is obtained by reacting an alkali metal with ammonia to form a liquid phase thereof.

7. The method according to claim 4, wherein lithium amide is one of the alkali metal amides, and is thermally decomposed to form lithium nitride.

8. The method according to claim 1, wherein the mixture of at least two alkaline earth metal amides is thermally decomposed to form the composite of at least two alkaline earth metal nitrides.

9. The method according to claim 1, comprising thermally decomposing a mixture of at least two alkaline earth metal amides selected from the group consisting of calcium amide, strontium amide and barium amide, to form a composite of at least two alkaline earth metal nitrides selected from the group consisting of calcium nitride, strontium nitride and barium nitride.

10. A method for producing a metal nitride, the method comprising:
   (i) thermally decomposing an alkali metal amide at a temperature of 300° C. to 700° C. for 1 hour to 24 hours under vacuum or under an inert gas to form an alkali metal nitride;
   (ii) thermally decomposing an alkaline earth metal amide at a temperature of 800° C. to 1200° C. for 1 hour to 24 hours under vacuum or under an inert gas to form an alkaline earth metal nitride; or
   (iii) thermally decomposing a mixture of at least two alkaline earth metal amides at a temperature of 800° C. to 1200° C. for 1 hour to 24 hours under vacuum or under an inert gas to form a composite of at least two alkaline earth metal nitrides,
   wherein the alkali metal amide, the alkaline earth metal amide, or both, is obtained by reacting at least one of an alkali metal and an alkaline earth metal with ammonia to form a liquid phase thereof.

11. A method for producing a metal nitride, the method comprising thermally decomposing an alkaline earth metal amide at a temperature of 800° C. to 1200° C. for 1 hour to 24 hours under vacuum or under an inert gas to form an alkaline earth metal nitride.

12. The method according to claim 11, wherein the alkaline earth metal amide is thermally decomposed as a raw material.

13. The method according to claim 11, wherein the alkaline earth metal amide is obtained by reacting an alkaline earth metal with ammonia to form a liquid phase thereof.

14. The method according to claim 11, comprising thermally decomposing at least one alkaline earth metal amide selected from the group consisting of calcium amide, strontium amide and barium amide, to form at least one alkaline earth metal nitride selected from the group consisting of calcium nitride, strontium nitride and barium nitride.

* * * * *